US009182823B2

(12) United States Patent
Feng et al.

(10) Patent No.: US 9,182,823 B2
(45) Date of Patent: Nov. 10, 2015

(54) ACTUATING HAPTIC ELEMENT OF A TOUCH-SENSITIVE DEVICE

(71) Applicant: Lenovo (Singapore) Pte. Ltd., New Tech Park (SG)

(72) Inventors: Xin Feng, Arcadia, CA (US); Peter Carlson Rane, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 50 days.

(21) Appl. No.: 14/159,619

(22) Filed: Jan. 21, 2014

(65) Prior Publication Data

US 2015/0205354 A1     Jul. 23, 2015

(51) Int. Cl.
*G06F 3/041*      (2006.01)
*G06F 3/01*      (2006.01)
*G06F 3/0484*      (2013.01)
*G06F 3/0488*      (2013.01)

(52) U.S. Cl.
CPC ............. *G06F 3/016* (2013.01); *G06F 3/0412* (2013.01); *G06F 3/0416* (2013.01); *G06F 3/04842* (2013.01); *G06F 3/04883* (2013.01); *G06F 3/04886* (2013.01)

(58) Field of Classification Search
CPC ...... G06F 3/041; G06F 3/0416; G06F 3/0412; G06F 3/04883; G06F 3/0488; G06F 3/03545; G06F 3/044
See application file for complete search history.

(56) References Cited

U.S. PATENT DOCUMENTS

| 8,022,933 B2 | 9/2011 | Hardacker et al. |
| 2012/0249474 A1 | 10/2012 | Pratt et al. |
| 2013/0050135 A1 | 2/2013 | Stewart et al. |

OTHER PUBLICATIONS

Xin Feng, Carlos Munoz-Bustamante, "Using Haptic Feedback on a Touch Device to Provide Element Location Indications", file history of related U.S. Appl. No. 14/159,225, filed Jan. 20, 2014.
Xin Feng, Carlos Munoz-Bustamante, "Using Haptic Feedback on a Touch Device to Provide Element Location Indications" related U.S. Appl. No. 14/159,225 non-final office action dated Jun. 23, 2015.
Xin Feng, Carlos Munoz-Bustamante, "Using Haptic Feedback on a Touch Device to Provide Element Location Indications" related U.S. Appl. No. 14/159,225, applicants response to the non-final office action filed Jun. 23, 2015.

*Primary Examiner* — Olga Merkoulova
(74) *Attorney, Agent, or Firm* — John L. Rogitz; John M. Rogitz

(57) ABSTRACT

In one aspect, an apparatus includes a housing, a haptic element on at least a portion of the housing that has a non-discrete configuration and at least a first discrete configuration, a processor, a touch-enabled display operatively coupled to the processor, and a memory accessible to the processor. The memory bears instructions executable by the processor to initiate a function at the apparatus, and at least in part in response to initiation of the function, actuate a portion of the haptic element.

20 Claims, 8 Drawing Sheets

| Function | Actuating Haptic Element Applicable: |
|---|---|
| Present incoming phone call | Yes; Present answer and ignore buttons |
| Presenting sports scores | No |
| Presenting alarm | Yes; Present snooze and off buttons |

FIG. 5

ACTUATING HAPTIC ELEMENT OF A TOUCH-SENSITIVE DEVICE

I. FIELD

The present application relates generally to actuating a haptic element on a device.

II. BACKGROUND

Input elements on user interfaces (UIs) presented on a touch-enabled display of a device may be difficult to locate particularly for visually impaired users, and/or when a non-visually impair user's attention cannot be fully devoted to the UI to manipulate it. However, even under such circumstances a user may still wish and/or need to provide input to the device at such a time, which may prove quite difficult owing to the lack of being able to adequately view and/or manipulate the UI presented on the touch-enabled display.

SUMMARY

Accordingly, in a first aspect an apparatus includes a housing, a haptic element on at least a portion of the housing that has a non-discrete configuration and at least a first discrete configuration, a processor, a touch-enabled display operatively coupled to the processor, and a memory accessible to the processor. The memory bears instructions executable by the processor to initiate a function at the apparatus, and provide a signal to the haptic element for the haptic element to transition from the non-discrete configuration to the first discrete configuration at least in part in response to initiation of the function.

In another aspect, a method includes executing a function at a device and commanding a haptic component to assume a first discrete configuration at least in part in response to executing the function. The haptic component is included on the device and changes between a non-discrete configuration and the first discrete configuration.

In still another aspect, a device includes a haptic element transitionable at least between a non-discrete configuration and a first discrete configuration, a processor, a touch-enabled display, and a memory accessible to the processor. The memory bears instructions executable by the processor to undertake a function at the device and actuate a portion of the haptic element at least in part in response to the function being undertaken. The portion of the haptic element does not include the entirety of the haptic element.

The details of present principles, both as to their structure and operation, can best be understood in reference to the accompanying drawings, in which like reference numerals refer to like parts, and in which:

BRIEF DESCRIPTION OF THE DRAWINGS

FIG. 3 is a perspective view of a system which may be a tablet computer according to present principles, it being understood that present principles similarly apply to e.g. smart phones, so-called convertible devices, and the like;

FIG. 5 is an exemplary lookup table that may be used in accordance with present principles.

DETAILED DESCRIPTION

Figure 1:
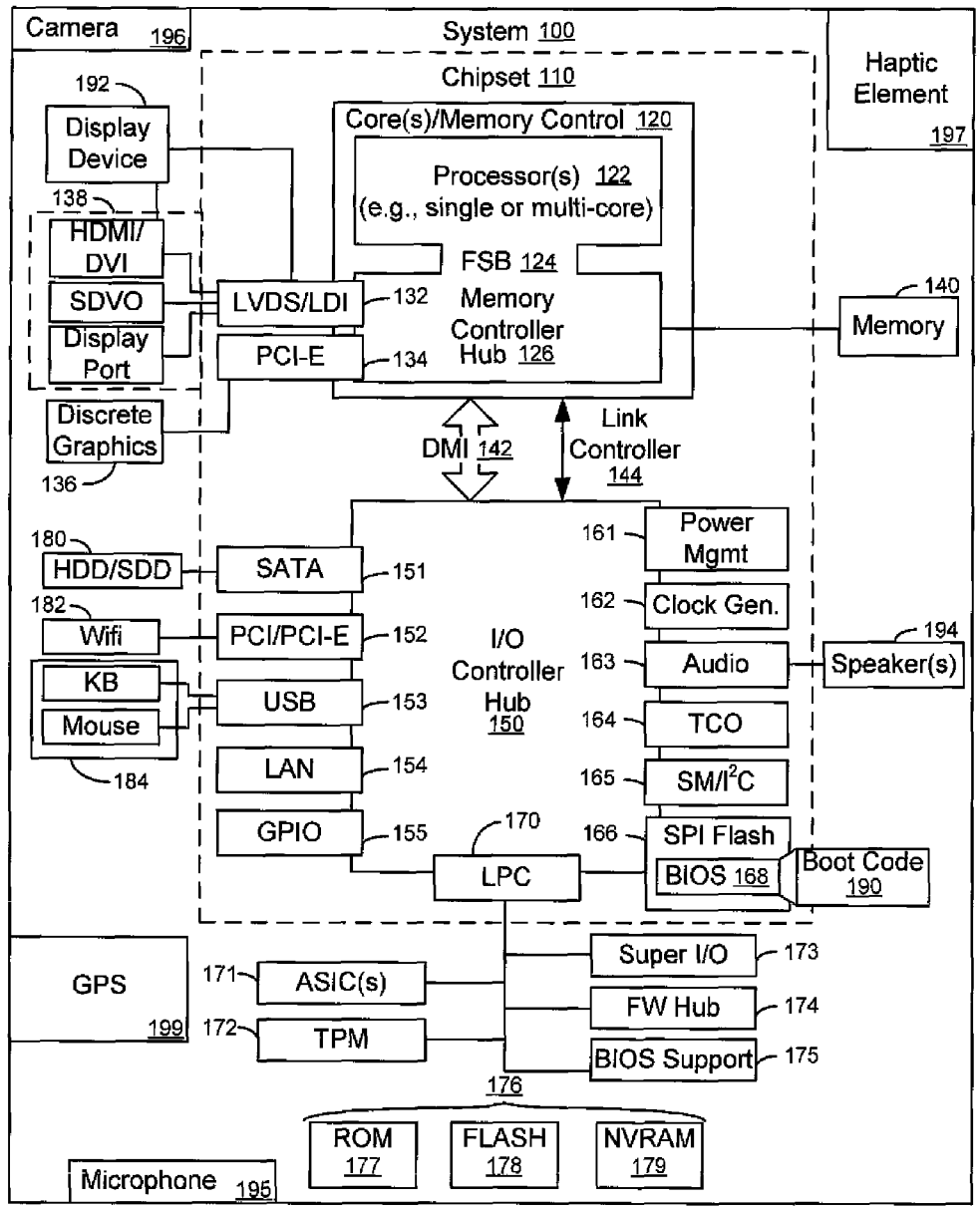
FIG. 1 is a block diagram of an exemplary system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/ or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an exemplary block diagram of an information handling system and/or computer system 100 such as e.g. an Internet enabled, computerized telephone (e.g. a smart phone), a tablet computer, a notebook or desktop computer, an Internet enabled computerized wearable device such as a smart watch, a computerized television (TV) such as a smart TV, etc. Thus, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, FIDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195. A camera 196 is also shown, which is in communication with and provides input to the processor 122. The camera 196 may be, e.g., a thermal imaging camera, a digital camera such as a webcam, and/or a camera integrated into the system 100 and controllable by the processor 122 to gather pictures/images and/or video. Further, the system 100 includes a haptic element 197 configured to assume at least a non-discrete configuration and one or more discrete configurations in accordance with present principles.

In addition, a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
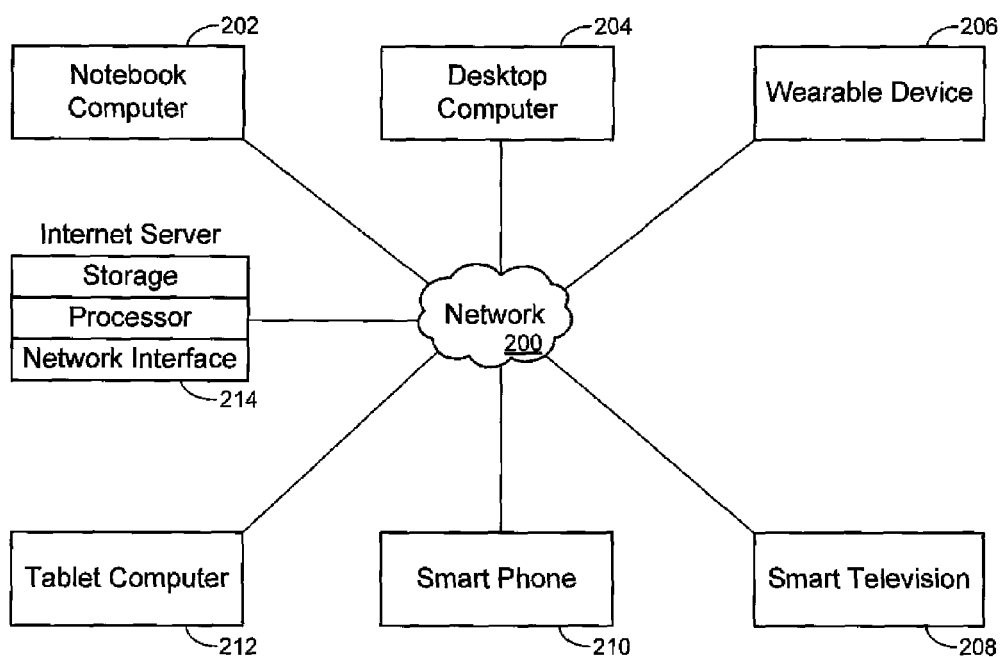
FIG. 2 is a block diagram of a network of devices in accordance with present principles.

Before moving on to FIG. 2, it is to be understood that an exemplary client device or other machine/computer may include fewer or more features than shown on the system 100 of FIG. 1. In any case, it is to be understood at least based on the foregoing that the system 100 is configured to undertake present principles.

Turning now to FIG. 2, it shows exemplary devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
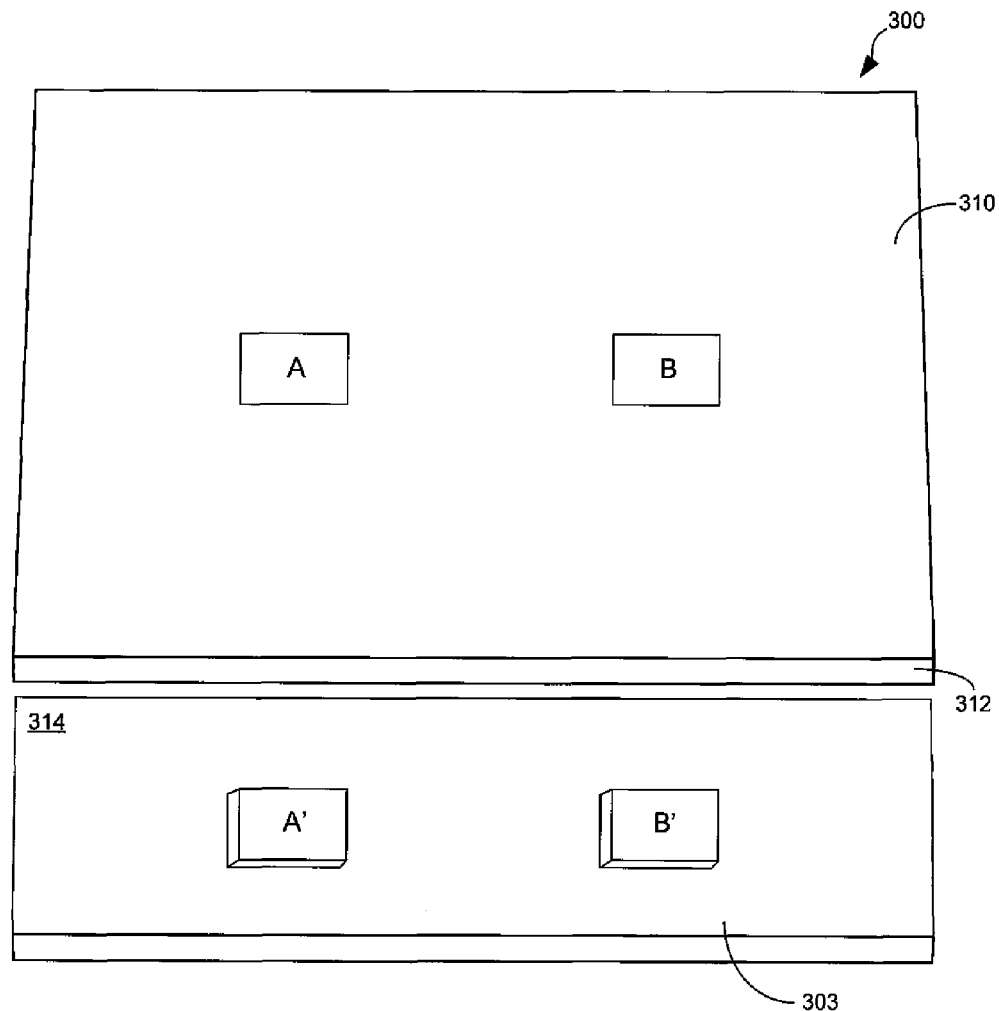

Referring to FIG. 3, it shows an information handling device 300 with a touch-enabled display area 310. The device 300 shown in FIG. 3 is a tablet computer, it being understood that present principles apply to other devices such as smart phones with touch sensitive displays.

The touch-enabled display area 310 may include both visible output elements such as matrix-type display elements and also include a touch-based sensing layer typically underneath the display elements (relative to a user looking at the display), although in some embodiments a transparent sensing layer may be provided on top of the display elements. The sensing layer may be embodied by, e.g., a capacitive touch based layer as, by way of example, inclusion of copper and/or printed ink and/or Indium tin oxide (ITO) capacitive traces. Note that the sensing layer may output signals representative not only of direct contact with the display area 310 but also representative of proximity of a hand or finger to the display area 310. The difference between determining a direct touch has occurred and a close proximity (but not touching) of a finger with the display area 310 has occurred may be made based on, e.g., the amplitude of the signal output by the touch sensing layer, with output amplitudes below a threshold being interpreted as non-touch but proximate hover and output amplitudes above a threshold being interpreted as direct touches against the display area 310.

In any case, a haptic element in accordance with present principles as shown on the device 300 of exemplary FIG. 3 is a haptic (e.g. membrane) layer 303. The layer 303 is understood to be on or near the back panel 312 of the apparatus. The back panel 312 in this exemplary embodiment is understood to be the panel (e.g. facing) opposite the display portion and may be e.g. incorporated into and/or form part of the device's housing. It is to be further understood that the panel 312 includes a surface area 314 facing opposite the display area 310 and outwardly of the device 300, though for clarity in exemplary FIG. 3 the surface area 314 is shown facing more or less the same direction as the display area 310. The haptic layer 303 may be made of material and/or parts available from vendors such as Tactus Technology, Inc. and/or the Touchsense® line of products vended by Immersion Corp.

As is to be appreciated in reference to FIG. 3, one or more portions of the haptic layer 303 may be actuated to be discrete at one time. Portions that are actuated to be discrete may be located on portions of the area 314 that correlate to portions of area 310 on which corresponding selector elements are presented having the same underlying function if selected as the respective discrete portion. Thus, e.g., respective discrete portions as manifested on the area 314 are understood to in some instances appear "under" respective selector elements on the area 310 with the same underlying function relative to a user looking at the front of the device including the area 310.

For example, when the display area 310 presents visible selectable input elements "A" and "B" that can be touched to be sensed by the touch sensing layer to thus input commands correlated to the input elements, the haptic layer 303 may include e.g. two separately actuatable three dimensional regions "A prime" and "B prime" on the layer 303 that can be respectively actuated as set forth herein (e.g. to physically protrude from the panel 312 and/or otherwise flat and/or non-discrete portions of the layer 303) to tactilely indicate to a user touching the back of the display that input elements "A" and "B", respectively, are being presented on the opposite (display) side of the device and/or that functions to occur responsive to selection of input elements "A" and "B" may also be respectively undertaken responsive to respective selection of "A prime" and "B prime."

Furthermore, while the haptic layer 303 may be continuous in at least some respects in some instances (e.g. the surface when in its non-discrete configuration may appear continuous to a user), it is to be understood that in some implementations the haptic layer 303 may have and/or be separated into quadrants that are separately actuatable to cause a three-dimensional button and/or geometric shape to take shape on the actuated quadrant. For example, a quadrant may be preconfigured (e.g. by the device manufacturer) to assume a particular shape when filled at least partially with a liquid and/or solution (e.g. that may comprise one or more oils), and that the quadrant may sense its protruding portion being depressed and/or that the user is providing input to the quadrant based on e.g. redistribution of fluid in the quadrant after it has been at least partially filled based on a user depressing the quadrant.

Figure 4:
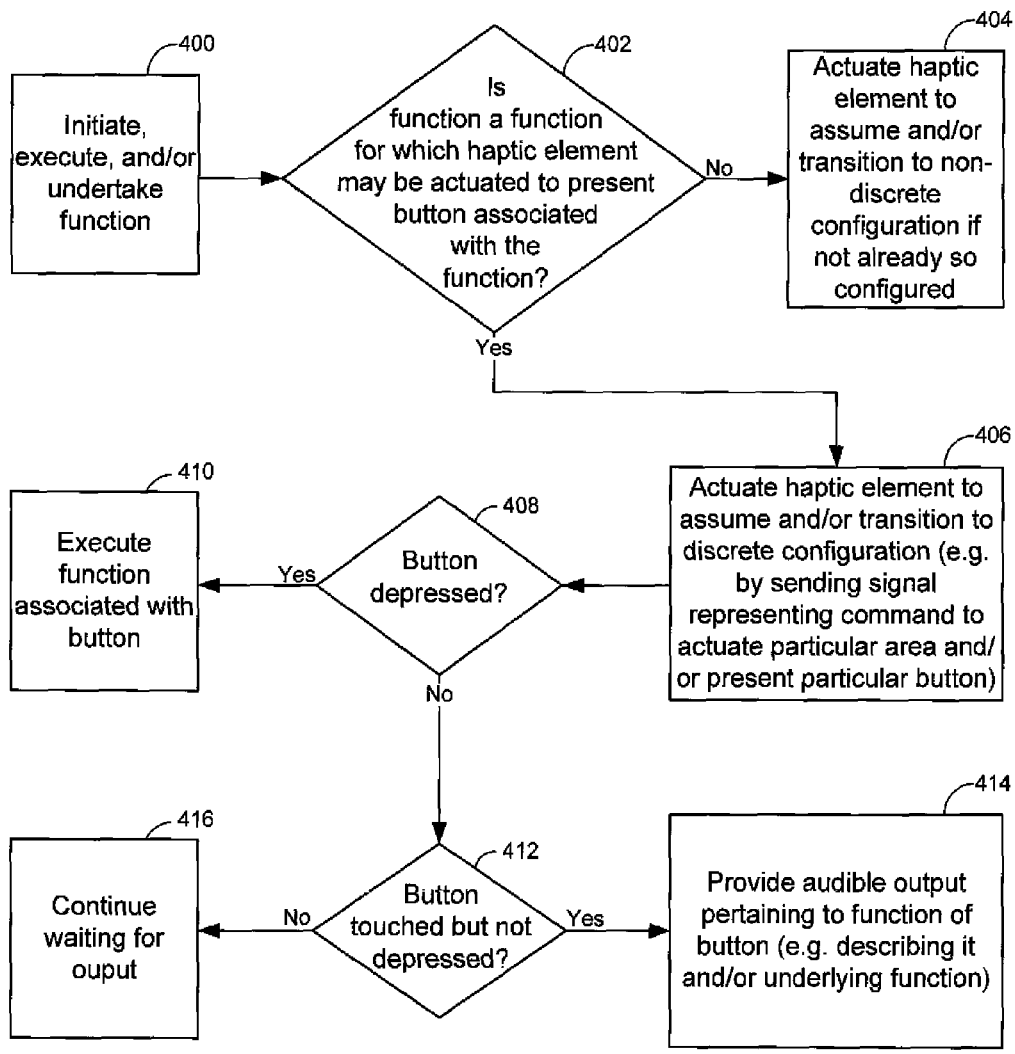
FIG. 4 is an exemplary flowchart of logic to be executed by a system in accordance with present principles.

FIG. 4 illustrates logic that may be executed by any of the foregoing devices. Beginning at block 400, the logic initiates, executes, and/or undertakes a function such. The function may be e.g. receiving a telephone call, email, and/or text message and presenting an indication of such to the user, determining that a time and/or alarm has expired and presenting an indication of such to the user, launching an application on the device in response to input (e.g. from a user) such as e.g. a media player application, etc.

The logic then continues from block 400 to decision diamond 402 where the logic determines whether the function initiated, executed, and/or undertaken at block 400 (e.g., and/or a device context such as what is being presented on the device's display or is to be presented on the device's display) is a function for which a haptic element in accordance with present principles may be actuated to present at least one button associated with the function initiated, executed, and/or undertaken at block 400. The determination made at diamond 402 may be made based on e.g. accessing a lookup table such as the table 500 to be described below in reference to FIG. 5 and making a determination at least partially based on the data contained therein.

In any case, a negative determination at diamond 402 causes the logic to proceed to block 404 where the logic actuates the haptic element to assume and/or transition to its non-discrete configuration (e.g. flat or at least substantially flat on the exposed surface area(s) of the haptic element) e.g. if it is not already configured in the non-discrete configuration. However, an affirmative determination at diamond 402 instead causes the logic to proceed to block 406 where the logic actuates the haptic element to assume and/or transition to a discrete configuration. The logic may actuate the haptic element at block 406 by e.g. providing a signal representing a command to the haptic element for the haptic element to actuate a particular area and/or present a e.g. dynamically discrete button.

From block 406 the logic continues to decision diamond 408. At diamond 408, the logic determines whether the area and/or button actuated to be presented at block 406 has been depressed e.g. by a user by pushing and/or pressing a dome portion of the button in. An affirmative determination at diamond 408 causes the logic to proceed to block 410 where the logic executes the function associated with the button that was pressed.

E.g., assume the function initiated at block 400 is to present an indication of an incoming telephone call, the haptic element that was actuated at block 406 was actuated to present an answer button and an ignore button, and that the user has depressed the ignore button as determined at diamond 408. The logic at block 410 in this example would ignore the telephone call, cease presenting the indication of the telephone call, and/or drop the telephone call, but in each case does so in response to an affirmative determination made at diamond 408.

Referring back to decision diamond 408, should a negative determination be made thereat, the logic instead proceeds to decision diamond 412. At decision diamond 412 the logic determines whether the area and/or button actuated to be presented at block 406 has been touched by a user but not depressed (e.g. there has been physical contact made between the user's finger and the button without pushing and/or pressing a dome potion of the button in). An affirmative determination at diamond 412 causes the logic to proceed to block 414 where the logic may provide audible output pertaining to one or more functions of the button that has been touched but not depressed. For instance, the audible output may describe the touched button itself (e.g. its appearance and/or shape), indicate a title for the touched button, describe the underlying function to be executed should the touched button be depressed, etc.

For instance, the following is an example of audible output that may be provided at block 414 over speakers of the device undertaking the present logic when a play/pause button is touched but not depressed: "This is a 'play' button, which if selected will cause your playlist to resume playing where it left off." As another example, the device responsive to an answer telephone call button being touched but not depressed may audibly indicate: "Press this button to answer the call." As but one more example, the device responsive to a snooze button being touched but not depressed may audibly indicate: "This is a snooze button for the alarm that is currently occurring." Thus, it is to be understood that to undertake such principles, the haptic element may have its own touch-sensing layer for such purposes.

Continuing the detailed description in reference to FIG. 5, it shows a lookup table and/or data table 500 for determining (e.g. such as at diamond 412 as described above) whether a function initiated, executed, and/or undertaken (e.g. such as at block 400 as described above) is a function for which a haptic element in accordance with present principles may be actuated to present at least one button associated with the function initiated, executed, and/or undertaken. Thus, the table 500 includes a first column 502 including plural data entries 506 of functions of the device, and a second column 504 including plural data entries 508 for whether actuating a haptic element to configure it in a discrete configuration in accordance with present principles is applicable. As may be appreciated from the table 500, an entry in the first column 502 for presenting an incoming phone call is correlated at column 504 with data that presenting an incoming phone call is a function for which the haptic element may be actuated to present at least one button associated with the telephone call, and with data regarding the button(s) (and/or locations) to be actuated by the device (e.g. in response to and/or concurrently with presenting an indication of an incoming phone call on the device).

The table 500 also includes an entry in the first column 502 for presenting sports scores, which is correlated at column 504 with data that presenting sports scores is a function for which the haptic element is not actuated to present at least one button. Though not shown on the table 500, note that the data in the column 506 correlated to presenting sports scores may include, in addition to the forgoing, data that the haptic element may be actuated to be configured in its non-discrete configuration.

Figure 6:
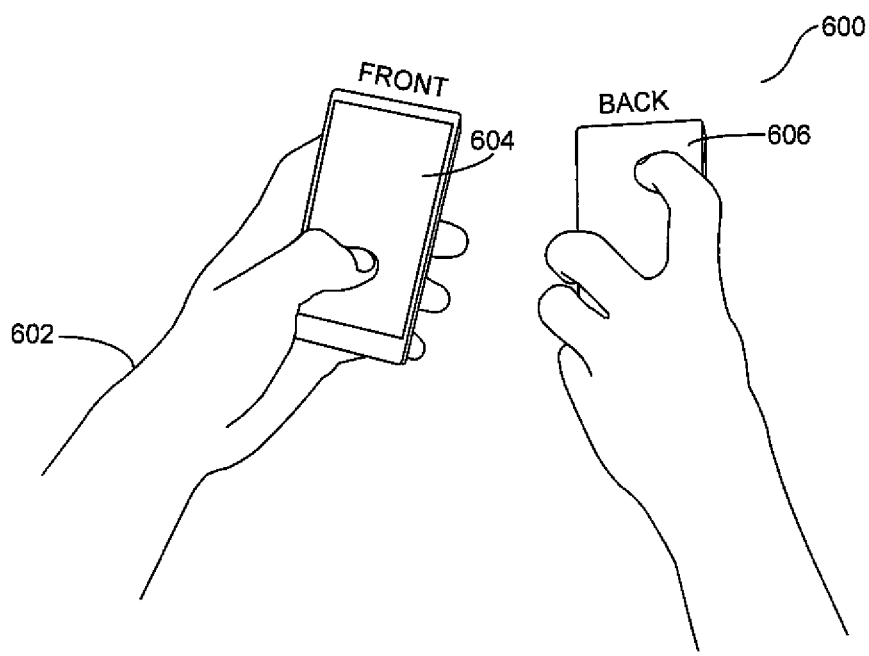
FIGS. 6-10 are exemplary illustrations of present principles.

Now in reference to FIG. 6, an example illustration 600 of present principles is shown. The illustration 600 shows a user 602 holding a device (e.g. a smart phone) having a front 604 and a back 606, it being noted that the back 606 is understood to include a haptic element in accordance with present principles on at least a portion of the exterior surface of the back 606. As may be appreciated from the illustration 600, no selector elements and/or indications are being presented on the front 604 of the device, and hence no buttons are being presented on the back 606 and e.g. the haptic element on the back 606 is thus in its non-discrete configuration. The back 606 may be in its non-discrete configuration as shown in the illustration 600 if e.g. the user is browsing the device itself and/or the Internet.

Figure 7:
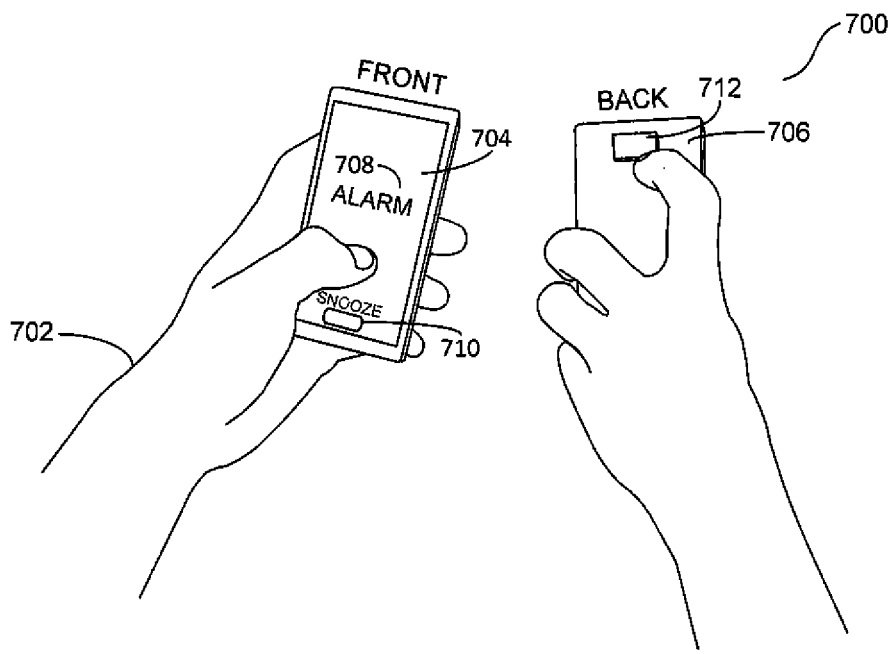

Turning to FIG. 7, it shows an example illustration 700 where a user 702 is holding a device (e.g. a smart phone) having a front 704 and a back 706, it being noted that the back 706 is understood to include a haptic element in accordance with present principles on at least a portion of the exterior surface of the back 706. As may be appreciated from the illustration 700, an indication 708 of an alarm is presented on the front 704, along with a snooze selector element 710 selectable to automatically responsive thereto provide input to the device to execute a snooze command for the alarm. Also note that the haptic element on the back 706 has been actuated to present a three dimensional button 712 depressible to automatically responsive thereto provide input to the device to execute a snooze command for the alarm. Note that since only a single selector element 710 is presented on the front 704 of the device (e.g. on the device's display), only a single button 712 is presented on the back 706 (e.g. and not necessarily "under" the selector element 710 when looking at the front of the device when upright), and that indeed in some instances the underlying function to be executed responsive to selection of the button 712 may be logically implied to and/or determined by a user when touching but not looking at the button 712 since it is the only function for which the button 712 may apply and/or be associated with based on the front 704 only presenting a single corresponding element 710.

Figure 8:
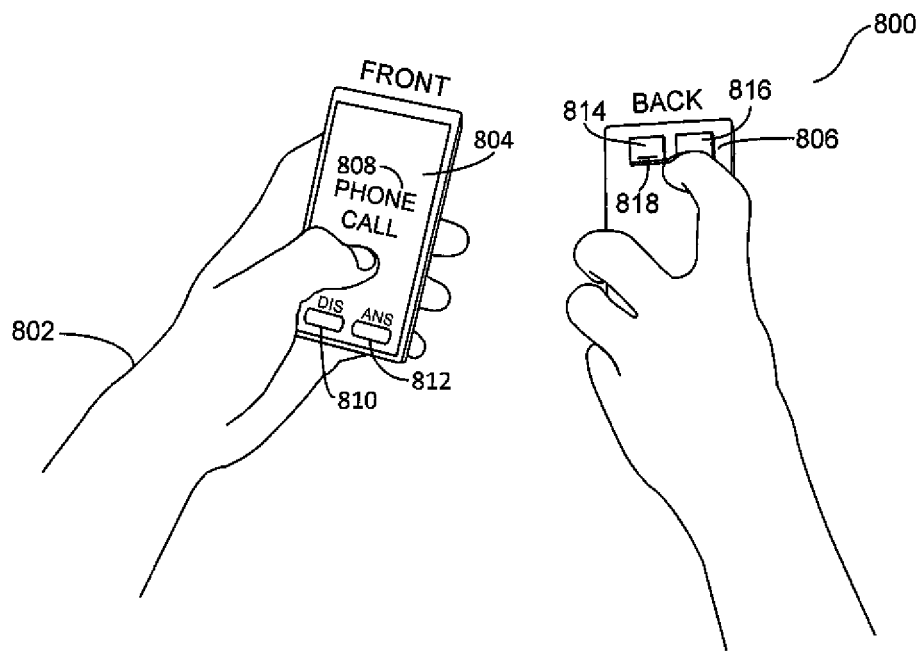

Continuing in reference to FIG. 8, it shows an example illustration 800 where a user 802 is holding a device (e.g. a smart phone) having a front 804 and a back 806, it being noted that the back 806 is understood to include a haptic element in accordance with present principles on at least a portion of the exterior surface of the back 806. As may be appreciated from the illustration 800, an indication 808 of an incoming telephone call is presented on the front 804, along with a dismiss selector element 810 and an answer selector element 812 selectable to automatically responsive thereto provide input to the device to execute a dismiss or answer command, respectively. Also note that the haptic element on the back 806 has been actuated to present a first three dimensional button 814 depressible to automatically responsive thereto provide input to the device to execute an answer command for the telephone call, and to present a second three dimensional button 816 depressible to automatically responsive thereto provide input to the device to execute a dismiss command for the telephone call. What's more, the button 814 includes a haptic obtrusion 818 (e.g. a tactile horizontal line relative to the device being held upright, tactile dashes, and/or tactile dots, etc.) to physically and/or touchably distinguish the button 814 and indeed the function associated with the button 814 if selected from the function associated with the button 816 (which does not include a haptic obtrusion) if selected. However, note that in addition to or in lieu of the foregoing, still other ways of physically and/or touchably distinguishing functions for plural buttons presented on the haptic element may be used, such as e.g. actuating the buttons to manifest themselves in varying shapes, sizes (e.g., heights, widths, and/or lengths), varying haptic vibrations for each button that may be actuated at the haptic element for the respective button to vibrate, etc. Even further, note that the haptic element as presenting the buttons 814 and 816 has assumed a discrete configuration different from the discrete configuration for the haptic element shown in the illustration 700 (e.g. with the snooze button 712). Note also that although not directly "under" the selector elements 810 and 812 in this example, the buttons 814 and 816 respectively map the left/right order of the elements 810 and 812 relative to the user looking at the device.

Figure 9:
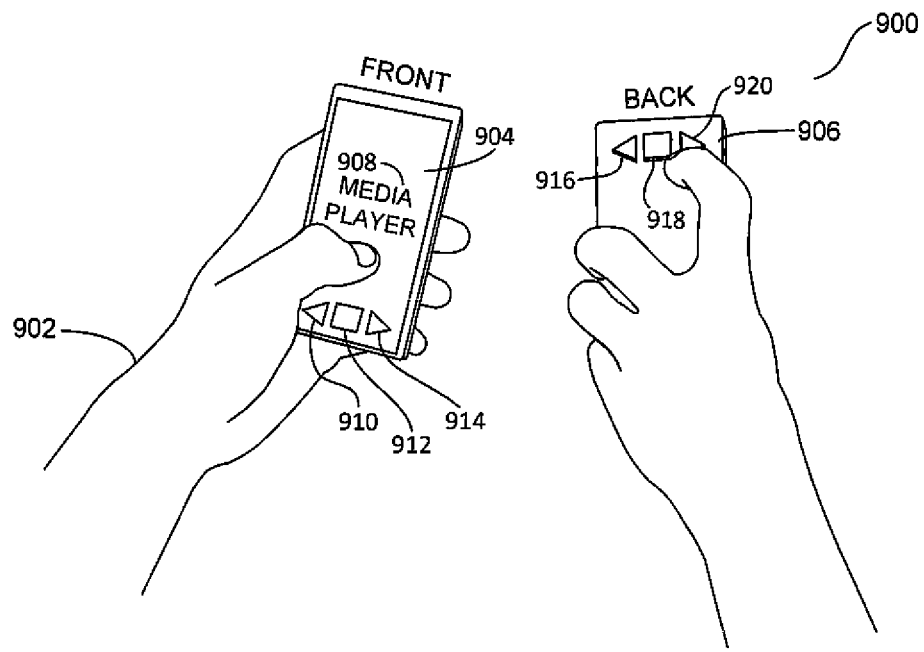

Reference is now made to FIG. 9, which shows an example illustration 900 where a user 902 is holding a device (e.g. a smart phone) having a front 904 and a back 906, it being noted that the back 906 is understood to include a haptic element in accordance with present principles on at least a portion of the exterior surface of the back 906. As may be appreciated from the illustration 900, an indication 908 that a media player application is being executed is presented on the front 904, along with a previous selector element 910, play/pause selector element 912, and next selector element 914 selectable to automatically responsive thereto provide input to the device to respectively execute either a previous, play/pause, or next command. Also note that the haptic element on the back 906 has been actuated to present a first three dimensional button 916 depressible to automatically responsive thereto provide input to the device to execute a next command to the media player, to present a second three dimensional button 918 depressible to automatically responsive thereto provide input to the device to execute a play or pause command to the media player, and to present a third three dimensional button 920 depressible to automatically responsive thereto provide input to the device to execute a previous command for the media player. Though not shown, it is to be understood that at least one and even each of the buttons 916, 918, and 920 may respectively include at least one haptic obtrusion different from haptic obstructions on the others of the buttons 916, 918, and 920 to physically and/or touchably distinguish the function associated with the respective button 916, 918, 920 if selected from the functions associated with the others of the buttons 916, 918, and 920 if selected. Even further, note that the haptic element as presenting the buttons 916, 918, and 920 has assumed a discrete configuration different from the discrete configuration for the haptic element shown in the illustration 700 (e.g. with the snooze button 712) and different from the discrete configuration for the haptic element shown in the illustration 800 (e.g. with the answer button 814 and dismiss button 816). Note also that although not directly "under" the selector elements 910, 912, and 914 in this example, the buttons 916, 918, and 920 respectively map the left/right order of the elements 910, 912, and 914 relative to the user looking at the device when upright.

Furthermore, as may be appreciated from FIG. 9, e.g. the previous and next buttons 920 and 916 are actuated on the haptic element to be three dimensional geometric shapes representing the buttons' respective underlying function to be executed responsive to user input to the buttons 920, 916. E.g., the previous button 920 appears as a "left" arrowhead to represent that selection of it will cause the device to present a "previous" song e.g. on a playlist relative to a currently presented song, and the next button 916 appears as a "right" arrowhead to represent that selection of it will cause the device to present a "next" song e.g. on a playlist relative to a currently presented song.

Figure 10:
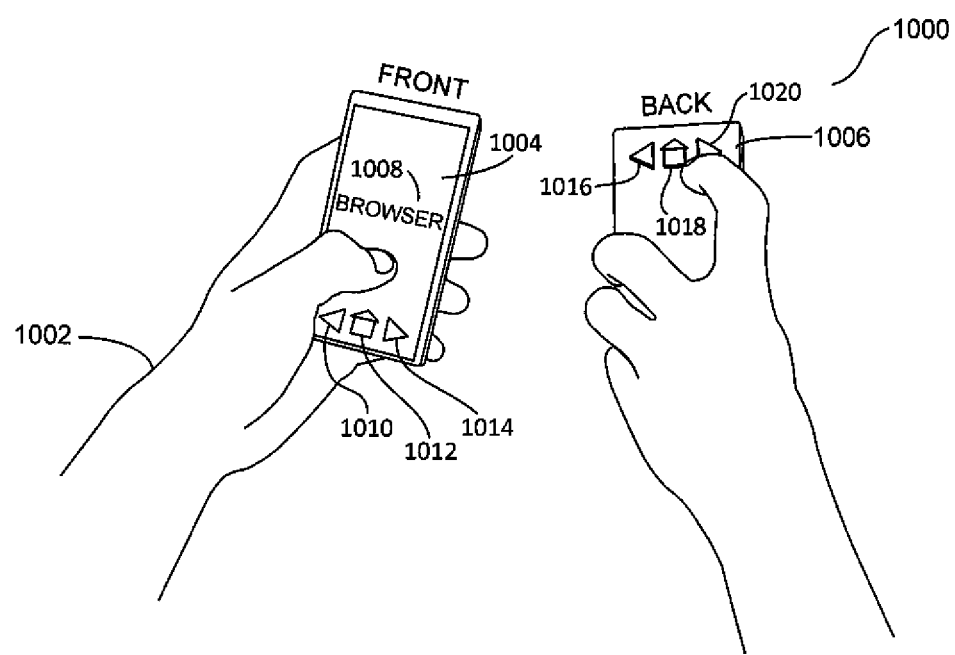

Continuing the detailed description in reference to FIG. 10, it shows an example illustration 1000 where a user 1002 is holding a device (e.g. a smart phone) having a front 1004 and a back 1006, it being noted that the back 1006 is understood to include a haptic element in accordance with present principles on at least a portion of the exterior surface of the back 1006. As may be appreciated from the illustration 1000, an indication 1008 that a browser application (e.g., a device browser and/or Internet browser) is being executed is presented on the front 1004, along with a back selector element 1010 selectable for going back to a previously browsed to e.g. Internet page, a home selector element 1012 selectable for causing a home screen of the browser and/or device to be presented, and a forward selector element 1014 selectable for going forward to an e.g. Internet page from the page being currently presented. Also note that the haptic element on the back 1006 has been actuated to present a first three dimensional button 1016 depressible to automatically responsive thereto provide input to the device to execute a forward command to the browser, to present a second three dimensional button 1018 depressible for causing a home screen and/or page of the browser and/or device to be presented, and to present a third three dimensional button 1020 depressible to automatically responsive thereto provide input to the device to execute a back command for the browser. Though not shown, it is to be understood that at least one and even each of the buttons 1016, 1018, and 1020 may respectively include at least one haptic obtrusion different from haptic obstructions on the others of the buttons 1016, 1018, and 1020 to physically and/or touchably distinguish the function associated with the respective button 1016, 1018, 1020 if selected from the functions associated with the others of the buttons 1016, 1018, and 1020 if selected. Even further, note that the haptic element as presenting the buttons 1016, 1018, and 1020 has assumed a discrete configuration different from the discrete configuration for the haptic element shown in the illustration 700 (e.g. with the snooze button 712), different from the discrete configuration for the haptic element shown in the illustration 800 (e.g. with the answer button 814 and dismiss button 816), and different from the discrete configuration for the haptic element shown in the illustration 900 (e.g. with the buttons 916, 918, and 920). Note also that although not directly "under" the selector elements 1010, 1012, and 1014 in this example, the buttons 1016, 1018, and 1020 respectively map the left/right order of the elements 1010, 1012, and 1014 relative to the user looking at the device when upright.

Furthermore, as may be appreciated from FIG. 10, e.g. the back and forward buttons 1020 and 1016 are actuated on the haptic element to be three dimensional geometric shapes representing the buttons' respective underlying function to be executed responsive to user input to the buttons 1020, 1016. E.g., the back button 1020 appears as a "left" arrowhead to represent that selection of it will cause the device to present a "previous" page e.g. relative to a currently presented page, and the forward button 1016 appears as a "right" arrowhead to represent that selection of it will cause the device to present a "next" page e.g. relative to a currently presented page.

Without reference to any particular figure, it is to be understood that e.g. a software application for undertaking present principles (e.g. for undertaking the logic set forth above in reference to FIG. 4) that is stored on the device may also be configured to present a settings user interface (UI) presentable on a display of the device for configuring settings of the software application in accordance with present principles, and indeed it is to be understood that underlying functions for selector elements appearing on the settings UI may be executed by the device responsive to user selection of corresponding buttons for them on a haptic layer as well. In any case, the settings UI may include an on/off selector element for respectively activating or deactivating the haptic element from being actuated to assume one or more discrete configurations e.g. for any function for which it may be actuated. Moreover, such a settings UI may in some embodiments include individual function selector elements for selecting particular functions for which discrete buttons on the haptic element may be presented in accordance with present principles. For instance, manipulating such a settings UI, a user may configure the device to present discrete buttons for incoming phone calls but to not present discrete buttons when a media player application is launched and/or being executed.

Also without reference to any particular figure, it is to be understood that other assistive technology such as screen readers may be used in parallel with the haptic element and/or audible output describing the buttons.

Present principles further recognize that although e.g. a software application for undertaking present principles (e.g. the logic of FIG. 4) may be vended with a device such as the system 100, it is to be understood that present principles apply in instances where such an application is e.g. downloaded from a server to a device over a network such as the Internet.

It may now be appreciated based on the foregoing that buttons may be presented e.g. on the back (and/or a side wall also bearing its own haptic element or a portion of the haptic element from the back) of a device e.g. only when those buttons may be useful in some instances. Moreover, it is to be understood that haptic elements in accordance with present principles may in some embodiments be juxtaposed on the device such that e.g. the buttons they manifest may be easily touched by a user's finger tips such as e.g. preconfiguring devices for right-handed users such that a right-handed user holding the device may touch any button manifested on the haptic element with a right index finger on the underside of the device's top left portion relative the right-handed user looking at the device when upright (e.g. without the user having to move the palm of their hand and/or at least some portions of their hand not including their fingers).

What's more, as may be appreciated from e.g. FIG. 4, assistive technology may be embodied by present principles in that e.g. a user may touch the dynamic button on the haptic element without pressing (e.g. in) the button to cause the device to audibly "read back" the underlying function of the button to the user.

While the particular ACTUATING HAPTIC ELEMENT ON A TOUCH-SENSITIVE DEVICE is herein shown and described in detail, it is to be understood that the subject matter which is encompassed by the present application is limited only by the claims.

What is claimed is:

1. An apparatus, comprising:
   a housing;
   a haptic element on at least a portion of the housing, the haptic element being transitionable between at least a non-discrete configuration and at least a first discrete configuration;
   a processor;
   a touch-enabled display operatively coupled to the processor; and
   a memory accessible to the processor and bearing instructions executable by the processor to:
   initiate a function at the apparatus; and
   at least in part in response to initiation of the function, provide a signal to the haptic element for the haptic element to transition from the non-discrete configuration to the first discrete configuration;
   wherein the haptic element transitions to the first discrete configuration in response to receipt of the signal;
   wherein the haptic element in the first discrete configuration includes at least a first discrete button;
   wherein at least a portion of the haptic element is touch-sensitive, wherein the first discrete button is depressible to execute a first command, and wherein the first discrete button is touchable for a threshold time without depressing it to execute a second command different from the first command.

2. The apparatus of claim 1, wherein the haptic element in the first discrete configuration includes at least one discrete three dimensional geometric shape which represents a function to be executed responsive to user input to the three dimensional geometric shape.

3. The apparatus of claim 2, wherein the haptic element in the first discrete configuration includes the first discrete button and a second discrete button, the first discrete button being depressible to execute the first command, the second discrete button being depressible to execute a third command, the third command being different than the first command and the second command.

4. The apparatus of claim 1, wherein the haptic element has at least first and second discrete configurations, the first discrete configuration being different than the second discrete configuration.

5. The apparatus of claim 4, wherein the function is a first function and the signal is a first signal, wherein the haptic element transitions to the first discrete configuration in response to receipt of the first signal, wherein the instructions are executable by the processor to initiate a second function at the apparatus different from the first function, wherein at least in part in response to initiation of the second function the instructions are executable by the processor to provide a second signal different from the first signal to the haptic element for the haptic element to transition to the second discrete configuration, and wherein the haptic element transitions to the second discrete configuration in response to receipt of the second signal.

6. The apparatus of claim 5, wherein the first function is to provide an indication of an incoming telephone call and the second function is to provide an indication of an alarm.

7. The apparatus of claim 5, wherein initiation of the first function comprises initiation of an audio output application and initiation of the second function comprises initiation of a browser.

8. The apparatus of claim 1, wherein the second command is to provide audible output at the apparatus, the audible output pertaining the first command.

9. The apparatus of claim 1, wherein the second command is to provide audible output at the apparatus, and wherein the audible output comprises a description of the first command.

10. The apparatus of claim 1, wherein the second command is to provide audible output at the apparatus, and wherein the audible output comprises a description of the first discrete button.

11. new The apparatus of claim 1, wherein the second command is to provide audible output at the apparatus, and wherein the audible output comprises an indication of a name of the first discrete button.

12. A method, comprising:
executing a function at a device, the device including a haptic component which changes between a non-discrete configuration and at least a first discrete configuration; and
at least in part in response to executing the function, commanding the haptic component to assume the first discrete configuration;
wherein the method includes, in response to executing the function, determining that the function is a function for which the haptic component is manipulable to provide input associated with the function, and in response to determining that the function is a function for which the haptic component is manipulable to provide input associated with the function, commanding the haptic component to assume the first discrete configuration.

13. An device, comprising:
a haptic structure, the haptic structure being transitionable at least between a non-discrete configuration and a first discrete configuration;
a processor;
a touch-enabled display operatively coupled to the processor; and
a memory accessible to the processor and bearing instructions executable by the processor to:
present on the touch-enabled display a selector that is selectable to provide input of a first command to the device:
contemporaneously with presentation of the selector on the touch-enable display, actuate at least a portion of the haptic structure to assume the shape of a button that is also selectable to provide input of the first command to the device.

14. The device of claim 13, wherein the haptic structure is disposed on a first side of the device, wherein the touch-enabled display is disposed on a second side of the device opposite the first side of the device, and wherein the at least portion of the haptic structure is actuated to assume the shape of the button at least partially at a location on the haptic structure that corresponds transversely to a location on the touch-enabled display that presents the selector.

15. The device of claim 13, wherein the haptic structure is disposed on a first side of the device and has upper and lower ends relative to the device being viewed in a first orientation, wherein the touch-enabled display is disposed on a second side of the device opposite the first side of the device and has upper and lower ends relative to the device being viewed in the first orientation, wherein the at least portion of the haptic structure is actuated to assume the shape of the button at least partially at a location on the haptic structure at least adjacent to the upper end of the haptic structure, and wherein the selector is presented on the touch-enabled display at a location on the touch-enabled display at least adjacent to the lower end of the touch-nabled display.

16. The device of claim 13, wherein the button comprises the least one haptic obtrusion on at least one otherwise flat surface of the button at least while the haptic structure is actuated to assume the shape of the button.

17. The device of claim 13, wherein the haptic structure is actuatable to provide a vibration at least at the button.

18. The apparatus of claim 10, wherein the description of the first discrete button comprises a description of the appearance of the first discrete button.

19. The device of claim 16, wherein the at least one haptic obtrusion comprises one or more of; a line, a dash, a dot.

20. The device of clam 16, wherein the button is a first button, Wherein the at least one haptic obtrusion is a first haptic obtrusion, wherein the haptic structure is actuatable to assume the shape of the first button and a second button different from the first button, and wherein the second button comprises a second haptic obtrusion different from the first haptic, obtrusion on at least one otherwise flat shape of the second button at least while the haptic structure is actuated to assume the shape at least of the second button.

* * * * *